United States Patent Office 3,417,099
Patented Dec. 17, 1968

3,417,099
PRODUCTION OF EPISULPHIDES
Friedrich K. Lautenschlaeger, Toronto, Ontario, Canada, assignor to The Dunlop Company Limited, a British company
No Drawing. Filed Feb. 26, 1965, Ser. No. 435,739
Claims priority, application Great Britain, Mar. 14, 1964, 10,887/64; May 1, 1964, 18,119/64
12 Claims. (Cl. 260—327)

ABSTRACT OF THE DISCLOSURE

Preparation of monomeric vicinal episulphides by reducing a chloropolysulphide, being the reaction product of a hydrocarbon olefin with a sulphur chloride compound having a mol ratio of sulphur to chlorine of at least 0.5:1 in a nonacidic reducing system, e.g., aluminum amalgam and water; nascent hydrogen; lithium aluminum hydride; glucose in a basic medium; and sodium hydrosulphide and/or sodium sulphite. These episulphides may be polymerized or copolymerized to form polymers useful, for example, in adhesive compositions.

---

This invention relates to a process for the preparation of monomeric compounds, and to monomeric episulphides when prepared by the process.

According to the present invention a process for the preparation of a monomeric compound containing the group

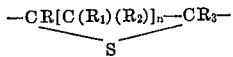

wherein each R group represents a hydrogen atom, an alkyl group, a cycloalkyl group or an aralkyl group, and $n$ is an integer, comprising reducing a chloropolysulphide, being the reaction product of a hydrocarbon olefine with a sulphur chloride compound having a mole ratio of sulphur to chlorine of at least 0.5:1, using a nonacidic reducing system.

According to the present invention also, there is provided a monomeric compound being a derivative of ethylene, propylene, butene or norbornene when prepared by the method according to the immediately preceding paragraph. Examples of monomeric compounds which may be prepared by the method of the present invention are the episulphides of mono-olefines such as ethylene, propylene, butene, pentene, 4-methyl-1-pentene, 4-methyl-2-pentene, hexene, octene-1 and octene-2; the episulphides of cycloaliphatic monoolefines such as cyclobutene, cyclopentene, cyclohexene and cyclooctene; the monoepisulphides and diepisulphides of acyclic aliphatic diolefines such as butadiene, hexadiene and octadiene; the episulphides of cyclic diolefines such as cyclopentadiene, cyclohexadiene, and cyclooctadiene, and the episulphides of aromatic olefines such as styrene. An example of a monomeric compound of the above formula where $n$ is greater than 1 is bicyclothianonane.

The chloropolysulphide which is reduced to form the monomeric compound is obtained by reacting a hydrocarbon olefine with a sulphur chloride compound having a mole ratio of sulphur to chlorine of at least 0.5:1. It is to be understood that the sulphur in the sulphur chloride compound need not necessarily all be combined with the chlorine. For instance a mixture of two moles of free sulphur and one mole of sulphur dichloride is regarded for the purposes of this specification as a sulphur chloride compound having a mole ratio of sulphur to chlorine of 4:2, i.e., 2:1. However, the chlorine in the sulphur chloride compound must be combined with at least some of the sulphur since free chlorine is undesirable. An example of a suitable sulphur chloride compound is sulphur monochloride. Sulphur dichloride may be used but in this case the yields of the dichloropolysulphide are low, and it is preferred to use a sulphur chloride compound having a mole ratio of sulphur to chlorine of at least 1:1, and preferably greater than 1:1.

A suitable sulphur chloride compound having a mole ratio of sulphur to chlorine of greater than 1:1 can be obtained by reacting sulphur monochloride with sulphur, for instance by refluxing a mixture of the two reagents for several days and then removing excess sulphur monochloride. The product is a mixture of sulphur chlorides some of which may have a mole ratio of sulphur to chlorine as high as 25:1. By using such a mixture the yield of the chloropolysulphide obtained can be as high as 100 percent.

The amount of sulphur chloride compound used is usually such that the mole ratio of the sulphur chloride compound when based on the average molecular weight, i.e., the weight of the compound which would completely react with 2 moles of a mono-olefine so that all the available chlorine had been extracted, to the hydrocarbon olefine is from 1:1 to 1:5, preferably from 1:2 to 1:3.5.

However, the amount of the sulphur chloride compound used when a diolefine is used is dependent to some extent upon whether it is desired to form a monoepisulphide or a diepisulphide. When it is desired to produce a diepisulphide, then the amount of the sulphur chloride compound used will usually be such that the mole ratio of the sulphur chloride compound when based on the average molecular weight to the hydrocarbon diolefine is preferably from 1:1 to 1:2.

The product of the reaction between the hydrocarbon olefine and the sulphur chloride compound is a mixture of a chloromonosulphide and a chloropolysulphide. It is the chloropolysulphide (usually a disulphide) which is reduced to produce an episulphide; the chloromonosulphide cannot be reduced to produce an episulphide.

The chloropolysulphide which is produced by reacting the sulphur chloride compound with the hydrocarbon olefine can be a monomeric dichloropolysulphide or a polymeric form of the dichloropolysulphide, depending upon the olefine used as starting material and the amount of the sulphur chloride compound used. When the olefine is a mono-olefine the product will be a monomeric dichloropolysulphide, but when a diolefine or a polyolefine, whether cyclic or acyclic, is used the product may be a monomeric chloropolysulphide or a polymeric form of the chloropolysulphide, depending to some extent upon the amount of the sulphur chloride compound used. The monomeric chloropolysulphide is reduced to form a monomeric compound containing a single group of the specified formula whether the original hydrocarbon olefine was a mono-olefine or a polyolefine. The polymeric form of the dichloropolysulphide is reduced to yield a compound containing two or more of the specified groups which may be a diepisulphide or an episulphide having more than two episulphide rings, depending upon the number of double bonds in the original olefine or it may be a polycyclic compound having a sulphur bridge. When the original olefine is a polyolefine, it is probable that the final product will be a mixture of the compound having one of the specified groups and the compound having more than one of the specified groups, the predominant product being determined by the amount of the sulphur chloride compound used and the reaction conditions.

If desired, the sulphur chloride compound can be added to the olefine in small proportions, or vice-versa. The chloropolysulphide can be prepared from a liquid olefine or a gaseous olefine and in the case where a gaseous olefine is used the olefine can be used in the form of a solution in a suitable solvent therefor such as carbon tetrachloride.

Alternatively, when a gaseous olefine is used the olefine can be added to the sulphur chloride compound or to a solution of the sulphur chloride compound in, for instance carbon tetrachloride, or the gaseous olefine can be formed into its liquid form prior to addition of the sulphur chloride compound and the reaction carried out in a sealed reaction vessel in the absence of a solvent for the olefine.

The reaction between the sulphur chloride compound and the hydrocarbon olefine may be carried out in the presence of a catalyst which is cationic in character. Examples of catalyst which may be used are zinc chloride, aluminium trichloride, ferric chloride, boron tri-fluoride which is normally used in the form of an etherate, and phosphorus pentachloride. If a catalyst is used the reaction is normally carried out at temperatures below room temperature, for example at temperatures between −10° C. and −50° C. Alternatively, the reaction can be carried out in the absence of a catalyst and in this case the temperature employed may be as high as 100° C. However when a gaseous olefine is used, temperatures of less than 100° C., e.g., 30° to 70° are used. The reaction can conveniently be carried out at the boiling point of the olefine, if this is a liquid at ordinary temperatures.

If desired, free sulphur or ethyl tetrasulphide may be added to the reaction mixture to regenerate sulphur monochloride from the sulphur dichloride formed. The amount of free sulphur or ethyl tetrasulphide added is not critical, and a large excess may be used if desired.

The reaction between the hydrocarbon olefine and the sulphur chloride compound can be effected in the absence of solvent. Alternatively the reaction can be carried out in an inert solvent such as a hydrocarbon, a chloro-substituted hydrocarbon or an ether. Examples of solvents which can be used are hexane, diethyl ether, carbon tetrachloride, and especially polar solvents such as acetonitrile and nitrobenzene. The amount of solvent used can vary considerably and is usually between 5 ml. and 50 ml. of solvent per mole of the olefine, preferably between 10 ml. and 25 ml. of solvent per mole of the olefine. However, amounts in excess of 50 ml. per mole can be used if desired.

Typical chloropolysulphides which can be reduced to form the monomeric episulphides can be prepared by reacting a hydrocarbon olefine with a sulphur chloride compound having a mole ratio of sulphur to chlorine of greater than 1:1. The chloropolysulphide so prepared can be reduced by the method according to the present invention to form a monomeric episulphide.

The reduction of the chloropolysulphide to the episulphide can be effected by mixing the chloropolysulphide with aluminium amalgam and adding water to the mixture. It is not necessary to isolate the chloropolysulphide prior to reducing it. This method of effecting the reduction is preferred since there is little tendency during the reduction step for the polymerization of the episulphide product to give a polyepisulphide. However, other reduction systems can be used providing care is taken to prevent the polymerization of the episulphide formed. Acidic systems should be avoided for this reason. Examples of other systems that may be used to reduce the chloropolysulphide are nascent hydrogen, glucose in a basic medium, lithium aluminium hydride, sodium hydrosulphide and sodium sulphite. The amount of the reducing agent is not vital, e.g., from 10 percent to 25 percent by weight of aluminium amalgam based on the weight of the chloropolysulphide to be reduced. The aluminium amalgam may be suspended in diethyl ether and the amount of diethyl ether is not critical but will usually be from 5 ml. to 50 ml. per gm. of aluminium amalgam.

The hydrocarbon olefines which can be used as starting materials can be the mono-olefines such as ethylene, propylene, butene, octene-1 and octene-2, or they can be diolefines such as hexadiene-1,5, or cyclic olefines such as cyclohexene and cyclohexadiene-1,4, or aromatic olefines such as allyl benzene.

It is to be understood that by the term "hydrocarbon olefine" there is meant an olefine containing carbon atoms and hydrogen atoms only, i.e., an olefine which is free from atoms other than carbon atoms and hydrogen atoms.

The rate of reaction between the sulphur chloride compound and the hydrocarbon olefine to form the chloropolysulphide, i.e., the rate of addition of the sulphur chloride compound to the olefine, can be increased by adding to the reaction mixture a compound which liberates free radicals such as diphenyl disulphide or butyl dithiocarbamate. Unfortunately this results in a product containing smaller amounts of the chloropolysulphide.

It is believed that the chloromonosulphide in the reaction product is produced by a side reaction involving radicals generated during the reaction between the hydrocarbon olefine and the sulphur chloride compound and that an increase in the amount of the chloropolysulphide produced can be obtained by adding hydroquinone to the reaction mixture.

The present invention provides a convenient and easy method for the preparation of monomeric episulphide compounds. Previous methods for preparing episulphides have been by reactions in which a thiol or an epoxide compound has been used as an intermediate.

The invention is illustrated by the following examples.

EXAMPLE I

This example illustrates the preparation of monomeric monoepisulphides from hydrocarbon mono-olefines.

To a clean, dry, three-necked flask fitted with a thermometer, a condenser fitted with a drying tube (calcium chloride), a dropping funnel and a stirrer was added 336 gm. (4 moles) of 2-methyl-1-pentene. The 2-methyl-1-pentene was stirred and 377 gm. of a sulphur chloride compound were added in small portions over a period of ten hours. The sulphur chloride compound has an average molecular weight of 220 (i.e., 220 gm. of this compound would completely react with 2 moles of a hydrocarbon mono-olefine until all available chlorine had been removed), and was obtained by refluxing a mixture of sulphur mono-chloride and free sulphur for several days and subsequently removing any unreacted sulphur monochloride by distillation. The mixture was cooled throughout by external cooling to maintain the temperature below 30° C. The reaction was allowed to proceed until all the sulfur chloride compound had reacted (as shown by a negative test with potassium iodide), and then any remaining 2-methyl-1-pentene and any other volatile compounds were removed by evaporation under reduced pressure to yield 553 gms. of bis(2-chloro-2-methyl-1-pentyl) polysulphide.

The above procedure was repeated eleven times (Experiments Nos. 2 to 12), but using the combinations of hydrocarbon mono-olefines and sulphur chloride compounds given in Table I below in which the amounts of each ingredient are also given. In Table I "SxCly" represents the average molecular weight of the sulphur chloride compound.

The product was confirmed by desulphurization with triphenyl phosphine to yield 2-methyl-1-pentene.

TABLE I

| Experiment No.: | Olefine | Amt. (gms.) | SxCly | Amt. (gms.) of SxCly |
|---|---|---|---|---|
| 1 | 2-methyl-1-pentene | 336 | 220 | 377 |
| 2 | 4-methyl pentene-2 | 119 | 162 | 83.3 |
| 3 | Decene-1 | 59 | 210 | 40 |
| 4 | Nonene-1 | 68.2 | 264 | 54.7 |
| 5 | Dodecene-1 | 90 | 264 | 66 |
| 6 | Pinene | 170 | 210 | 127 |
| 7 | Norbornene [1] | 73 | 218 | 81 |
| 8 | Cyclopentene | 160 | 164 | 198 |
| 9 | Cyclohexene | 30 | 282 | 10 |
| 10 | Cyclo-octene | 95.4 | 166 | 75 |
| 11 | 1-methyl cyclohexene | 96 | 164 | 82 |
| 12 | Allyl benzene [1] | 129 | 210 | 105 |

[1] In Experiments Nos. 7 and 12 the reaction was effected in the presence of 150 ml. of pentene and 150 ml. of hexane respectively.

In Experiments Nos. 2, 4, and 7 to 10, the sulphur chloride compound was added in a single portion; in Experiments Nos. 3, 6, 11 and 12 the sulphur chloride compound was added in small portions over a period of 1 hour, 32 hours, 3 hours and 10 hours respectively; and in Experiment No. 5 one third of the sulphur chloride compound was added initially and the remainder was added after 3 days.

The reaction conditions and the yields of chloropolysulphide are specified in Table II below, in which "time" represents the time required to complete the reaction after the final addition of the sulphur chloride compound.

TABLE II

| Experiment No.: | Initial Temp. (°C.) | Max. Temp. (°C.) | Time | Yield (gms.) |
|---|---|---|---|---|
| 1 | 25 | Below 30 | | 553 |
| 2 | 25 | do | 4 days | 167 |
| 3 | | do | 64 hours | 82.7 |
| 4 | 40 | Below 50 | 7 days | |
| 5 | 25 | Below 40 | 3 days | 150 |
| 6 | 0 | Below 10 | 30 mins | 288 |
| 7 | −40 | −30 [1] | 3 hours [1] | 143 |
| 8 | 25 | Below 40 | | 359 |
| 9 | 25 | Below 35 | 10 hours | 15.8 |
| 10 | 20 | Below 30 | | 171 |
| 11 | 25 | Below 45 | | 167 |
| 12 | 25 | Below 40 | 4 days | 200 |

The chloropolysulphide obtained as in Experiment No. 1 was then reduced to the mono-episulphide by the following procedure. The chloropolysulphide was not separated from the reaction mixture prior to its reduction.

484 gm. of the reaction product were dissolved in 1 litre of tetrahyrofurane and 100 gm. of aluminium amalgam were added to the resulting solution. 200 ml. of water were then added over a period of 8 hours.

When all the aluminium amalgam had reacted with the water, the resulting suspension was filtered and the residue was washed with diethyl ether and tetrahydrofurane. The filtrate was distilled to yield 53 gm. of a material having a boiling point of 23–24° C. at 8 mm. mercury pressure. This material was identified as 2-methyl-1-pentene episulphide which showed the following infrared spectrum, in which s=strong, m=medium, w=weak and sh=shoulder.

| | |
|---|---|
| 3030(s,sh) | 738(m) |
| 1450(s) | 2930(s) |
| 1260(w,sh) | 1377(s) |
| 1092(m) | 1200(w) |
| 982(m) | 1047(s) |
| 815(m) | 907(w) |
| 2980(s) | 1460(s,sh) |
| 1435(s,sh) | 1315(w) |
| 1242(s) | 1103(m) |
| 1081(m,sh) | 1036(s) |
| 935(w) | 892(m) |

The above reduction procedure was repeated with each of the reaction products, produced in Experiments 2 to 5, 8, 9, 11 and 12. The reaction conditions and the yields of episulphide are shown in Table IIA below, in which A represents the chloropolysulphide, Alam represents aluminium amalgam, and the yield is the yield of episulphide obtained.

TABLE IIA

| Export No.: | A (gms.) | Alam. (gms.) | T.H.F. (mls.) | Water (mls.) | Yield (gms.) |
|---|---|---|---|---|---|
| 1 | 484 | 100 | 1,000 | 200 | 53 |
| 2 | 166 | 100 | 1,000 | 200 | 36 |
| 3 | 51 | 15 | 300 | 40 | 14.4 |
| 4 | 98 | 40 | 800 | 50 | ([1]) |
| 5 | 120 | 40 | 800 | 100 | ([1]) |
| 8 | 205 | 100 | 1,000 | 200 | 70 |
| 9 | 80 | 20 | 100 | 25 | 16.2 |
| 11 | 125 | 100 | 1,000 | 200 | 35 |
| 12 | 150 | 40 | 1,000 | 125 | 28.7 |

[1] See below.

In Experiments Nos. 1, 2 and 8 the water was added over a period of 8 hours, and in the other experiments the water was added with fast stirring at a rate such that the temperature was maintained below 40° C.

In Experiments Nos. 4 and 5, the yields of the reaction shown were 57 gm. and 61 gm. respectively prior to distillation. The products were gasous at room temperature and so the technique employed was as follows. The product was evaporated in a molecular still and the volatile portion was collected in a water-cooled trap. This portion was then distilled to yield the episulphide. 12 gm. of nonene episulphide and 12.5 gm. of dodecane episulphide respectively were obtained.

The boiling points and refractive indices of some of the episulphides are given in Table IIB.

TABLE IIB

| Experiment No.: | Boiling point | Refractive Index ($n_D^{20}$) |
|---|---|---|
| 1 | 23–24° C. at 8 mms | |
| 2 | 30° C. at 16 mms | 1.4600 |
| 3 | 55–57° C. at 0.02 mm | 1.4720 |
| 4 | 57° C. at 0.1 mm | |
| 8 | 74° C. at 61 mms | |
| 9 | 28–30° C. at 1 mm | 1.5310 |
| 11 | 58° C. at 10 mms | |
| 12 | 57–60° C. at 0.01 mm | 1.5780 |

EXAMPLE II

This example illustrates the preparation of monomeric episulphides from hydrocarbon diolefines.

The procedure outlined in Example I for the preparation of a chloropolsulphide was repeated nine times but using the combinations of hydrocarbon diolefines and sulphur chloride compounds specified in Table III below.

TABLE III

| Experiment No.: | Olefine | Amt. (gms.) | SxCly | Amt. SxCly (gms.) |
|---|---|---|---|---|
| 1 | Hexadiene-1,5 | 58 | -------- | 87 |
| 2 | do | 74 | 210 | 178.5 |
| 3 | Pentadiene-1,4 | 82 | 210 | 227 |
| 4 | Octadiene-1,7 | 165 | 218 | 315 |
| 5 | Vinyl cyclohexene-4 | 108 | 218 | 218 |
| 6 | Cyclohexadiene-1,4 | 80 | 220 | 186 |
| 7 | Norbornadiene | 186 | -------- | 238 |
| 8 | Cyclo-octadiene-1,5 | 648(+108) | 218 | 654 |
| 9 | Exo-dicyclopentadiene | 13.2 | 272 | 26.5 |

The reaction conditions are given in Table IV, in which "addition period" shows the period of time over which the sulphur chloride compound was added, and "time" shows the time required to complete the reaction after the final addition.

TABLE IV

| Experiment No.: | Additional Period | Initial Temp. (° C.) | Max. Temp. (° C.) | Time |
|---|---|---|---|---|
| 1 | -------- | 25 | Reflux temp | 2 hours. |
| 2 | 24 hours | 25 | Below 45 | 1 hour. |
| 3 | 48 hours | -------- | Below 25 | 64 hours. |
| 4 | 12 hours | 25 | Below 40 | -------- |
| 5 | 3 hours | 25 | do | -------- |
| 6 | (¹) | −10 | Below 30 | 1½ hours. |
| 7 | (¹) | (²) | 30 | -------- |
| 8 | (¹) | -------- | Below 25 | -------- |
| 9 | (¹) | −20 | 40 | 8 hours. |

¹ In Experiment No. 6, 5 gm. of the sulphur chloride compound were added initially and after this had reacted (negative test with potassium iodide) a further 181 gm. were added with cooling and stirring.
² Below 0.

In Experiment No. 7 the norbornadiene was added to the sulphur chloride compound in an initial amount of 100 gm. at a temperature of below 0° C., followed by the addition of 50 gm. at a temperature of from 0° C. to 20° C. and finally the addition of 36 gm. at a temperature of from 20° C. to 30° C. In Experiment No. 8, 10 gm. of the sulphur chloride compound were added initially to 648 gm. of the diolefine and then 644 gm. were added in 10 ml. portions at intervals of time. After 500 gm. of the sulphur chloride compound has been added, 108 gm. of the diolefine were added to assist stirring of the mixture.

In Experiment No. 9, 13.25 gm. of the sulphur chlohide compound were added to the olefine at a temperature of −20° C. and the mixture was allowed to warm to 0° C. A further 13.25 gm. of the olefine were then added and the temperature was allowed to rise to 40° C. 10 ml. of tetrahydrofurane were added to assist stirring.

In each of Experiments 2 to 9 a chloropolysulphide was obtained. The product was not isolated but was reduced to the corresponding episulphide by the procedure outlined in Example I.

The amounts of the reaction product and the aluminum amalgam and water are specified in Table IVA below, in which X represents the reaction product containing the chloropolysulphide.

TABLE IVA

| Experiment No.: | X (gms.) | Alam. (gms.) | H₂O (mls.) | T.H.F. (mls.) | Yield (gms.) |
|---|---|---|---|---|---|
| 2 | (¹) | 110 | 100 | 800 | 12 |
| 3 | 140 | 40 | 100 | 1,000 | 3.4 |
| 4 | 242 | 60 | 100 | 750 | 3.5 |
| 6 | 150 | 100 | 200 | 800 | 13 |
| 8 | 500 | 50 | 100 | 800 | 20 |

¹ Whole.

The episulphides had the following properties.

TABLE IVB

| | Boiling point | Refractive Index ($n_D^{20}$) |
|---|---|---|
| Experiment No.: | | |
| 2 | 66–68° C. at 24 mms | 1.4969 |
| 3 | 58–61° C. at 0.7 mm | ¹ 1.5666 |
| 4 | 37–39° C. (melting point) | -------- |
| 6 | 60° C. at 10 mms | 1.5647 |
| 8 | 60–63° C. at 1.5 mms | -------- |

¹ Impure.

The main products in Experiments Nos. 3 and 4 were diepisulphides. In the other experiments the main products were the monoepisulphides.

EXAMPLE III

This example describes the preparation of propylene episulphide.

13 gm. of a sulphur chloride compound having an average molecular weight of 282 were placed in a Pyrex high-pressure tube and 15 gm. of propylene were then condensed into the tube at the temperature of liquid nitrogen. The tube was sealed under vacuum and then the reaction mixture was allowed to warm to room temperature. After 7 days a colourless solution had formed. The tube was cooled to the temperature of liquid nitrogen and was then opened. The excess propylene was allowed to evaporate to yield 16.1 gm. of a product which after distillation gave a product having a boiling point of 40–75° C. at a pressure of 0.5 mm. of mercury.

This product was analysed by gas chromatography and was found to contain 58.5 percent by weight of bis(beta-chloropropyl)polysulphide and 41.5 percent by weight of bis(beta-chloropropyl)monosulphide.

28.3 gm. of bis(beta-chloropropyl)polysulphide prepared as above was dissolved in 150 ml. of dimethylformamide and 20 gm. of aluminium amalgam were added. The suspension was heated to 130° C. and water was added (150 ml.) over a period of 1½ hours in 10 ml. portions. After the first addition of water 7 gm. of propylene episulphide distilled over together with excess water. The amount of propylene episulphide distilling over decreased as the reaction continued.

After 90 minutes the reaction was ceased, and the organic layer in the distillate was separated from the water by the dissolving it in pentane. The pentane solution was washed with water, dried over magnesium sulphate and distilled to yield 8 gm. (55%) of propylene episulphide having a boiling point of 74° C. and a refractive index $n_D^{20}=1.4792$.

EXAMPLE IV

This example illustrates the use of sodium sulphite and sodium hydrosulphide as the reducing agent.

A solution of 5 gm. of sodium hydrosulphide and 12 gm. of sodium sulphite in 200 ml. of water was heated to boiling in a distillation flask. 11 gms. of bis(beta-chloropropyl)polysulphide (prepared as in Example III) were added dropwise over a period of 2 hours to the boiling solution. Distillation was continued for 1 hour after the final addition of the bis(beta-chloropropyl)polysulphide, and after this time the clear distillate was extracted three times with 20 ml. portions of methylene chloride. The extracts were combined and dried over magnesium sulphate.

The infra red spectrum of the combined extracts showed that the major reaction product was propylene episulphide.

EXAMPLE V

This example illustrates the preparation of a compound containing the specified group in which $n$ is greater than zero.

Cyclooctadiene-1,5 was reacted with a polysulphur chloride compound to produce a chloropolysulphide which was insoluble in hexane. 242 gm. of this fraction insoluble in hexane were dissolved in 300 gm. of tetrahydrofurane and 50 gm. of aluminium amalgam were added.

120 ml. of water were then added with fast stirring at the boiling point of the suspension. After all the aluminium amalgam had reacted the suspension was suction filtered and the residue was washed with tetrahydrofurane. The combined filtrate and washing liquids were evaporated under vacuum and the residue was extracted with 50 ml. of hexane with stirring to leave 72 gm. of an insoluble material.

The hexane solution was evaporated to yield 113 gm. of a colourless oil. Samples of this oil were treated as follows:

(A) 68 gm. of the colourless oil were maintained at a temperature of −10° C. for 7 days after which time 10 gm. of a crystalline material had formed. Recrystallization from hexane gave hydroxy mercapto bicyclothianonane having a melting point of 74° C.

(B) 36 gm. of the oil were distilled at a pressure of 0.01 mm. of mercury to yield 7.5 gm. of a fraction distilling over at 80° C. This fraction was cooled to −10° C. and 1.2 gm. of bicyclothianonane dimercaptan of melting point 37–45° C. separated.

3 gm. of the liquor from which the dimercaptane had crystallized was suspended in 10 gm. of water and 1 gm. of sodium hydroxide was added. The undissolved material was extracted with pentane and the pentane solution was washed with water. The pentane was then evaporated to yield 2 gm. of cyclooctadiene monoepisulphide.

The basic aqueous solution from which the solids had been extracted with pentane was acidified with dilute sulphuric acid and the resulting oil was allowed to solidify to give 0.9 gm. of the dimercaptane derivative.

Having now described my invention what I claim is:

1. A process for the preparation of monomeric vicinal episulphides comprising reducing a chloropolysulphide, being the reaction product of a hydrocarbon olefin with a sulphur chloride compound having a mol ratio of sulphur to chloride of at least 0.5:1, using a nonacidic reducing system selected from the group consisting of aluminum amalgam and water, nascent hydrogen, lithium aluminum hydride, glucose in a basic medium, sodium hydrosulphide and sodium sulphite.

2. A process according to claim 1 in which the nonacidic reducing system is aluminum amalgam and water.

3. A process according to claim 1 in which the reduction is effected by nascent hydrogen.

4. A process according to claim 1 in which the nonacidic reducing system is lithium aluminum hydride.

5. A process according to claim 1 in which the nonacidic reducing system is glucose in a basic medium.

6. A process according to claim 1 in which the nonacidic reducing system is sodium hydrosulphide and/or sodium sulphite.

7. A process according to claim 2 in which the chloropolysulphide is added to a suspension of the aluminum amalgam in diethyl ether and water is added to the mixture.

8. A process according to claim 7 in which the water is added dropwise at such a rate that smooth refluxing of the mixture is maintained.

9. A process according to claim 7 in which the water is added dropwise until all the aluminum amalgam has reacted with the water.

10. A process according to claim 2 in which the amount of the aluminum amalgam is from 10 percent to 25 percent by weight based on the weight of the chloropolysulphide to be reduced.

11. A process according to claim 7 in which the amount of the diethyl ether is from 5 ml. to 50 ml. per gramma of the aluminum amalgam.

12. A process according to claim 1 in which said monomeric compound is separated from the reaction product and is also purified by distillation under a reduced pressure.

References Cited

UNITED STATES PATENTS 2,093,752   9/1937   Duecker et al. _____ 260—327

JAMES A. PATTEN, *Primary Examiner.*

U.S. Cl. X.R.

260—607, 608

Disclaimer 3,417,099.—*Friedrich K. Lautenschlaeger*, Toronto, Ontario, Canada. PRO-
DUCTION OF EPISULPHIDES. Patent dated Dec. 17, 1968.
Disclaimer filed Aug. 15, 1969, by the assignee, *The Dunlop Company Limited*.

Hereby disclaims the terminal portion of the term of the patent subsequent to Aug. 6, 1985.

[*Official Gazette December 9, 1969.*]